(12) United States Patent
MacFadden et al.

(10) Patent No.: US 6,440,611 B1
(45) Date of Patent: Aug. 27, 2002

(54) MICROCAPILLARY BATTERY SEPARATOR INCLUDING HOLLOW FIBERS, AND STORAGE BATTERY INCORPORATING SAME

(75) Inventors: Kenneth O. MacFadden, Hackettstown, NJ (US); Gordon W. Jones, Toledo, OH (US); Lixin L. Xue, Midilothian, VA (US); Ronald P. Rohrbach, Flemington, NJ (US); Daniel E. Bause, Flanders, NJ (US); Peter D. Unger, Morristown, NJ (US); Gary B. Zulauf, Findlay, OH (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 09/619,882

(22) Filed: Jul. 20, 2000

(51) Int. Cl.$^7$ .................................................. H01M 2/16
(52) U.S. Cl. ........................ 429/247; 429/249; 429/253; 429/254
(58) Field of Search ............................. 429/247, 249, 429/253, 254

(56) References Cited

U.S. PATENT DOCUMENTS

| | | |
|---|---|---|
| 3,811,957 A | 5/1974 | Buntin |
| 3,875,270 A | 4/1975 | Haefner et al. |
| 3,947,537 A | 3/1976 | Buntin et al. |
| 4,137,379 A | 1/1979 | Schmidt et al. |
| 4,440,838 A | 4/1984 | Schmidt |
| 4,705,809 A | 11/1987 | Dighton et al. |
| 5,057,368 A | 10/1991 | Largman et al. |
| 5,069,970 A | 12/1991 | Largman et al. |
| 5,158,844 A | 10/1992 | Hagens et al. |
| 5,318,866 A | 6/1994 | Degen et al. |
| 5,713,971 A | 2/1998 | Rohrbach et al. |
| 5,891,221 A | 4/1999 | Rohrbach et al. |
| 5,951,744 A | 9/1999 | Rohrbach et al. |
| 6,117,802 A * | 9/2000 | Rohrbach et al. ............ 442/372 |
| 6,200,706 B1 * | 3/2001 | Ashida et al. ............... 429/249 |

* cited by examiner

*Primary Examiner*—Patrick Ryan
*Assistant Examiner*—Dah-Wei D. Yuan

(57) ABSTRACT

A battery separator, for placement between conductive plates within a battery, includes a non-woven fiber mat made up of one or more nonwoven fibers, which have a specific cross-sectional shape and exhibit a microcapillary action. The fibers are preferred to be made of a thermoplastic selected from the group consisting of polyolefins, fluoropolymers, polyimides, polysulfones, polyesters, polyamides, and mixtures thereof Each of the fibers includes an outer surface, a hollow internal cavity, and an extended slot. The hollow internal cavity communicates with the outer surface by way of the extended slot. Capillary forces within the fibers are greater than those on the fiber surface, such that a liquid electrolyte readily moves through the interior of the fiber via a wicking action. As a result, the battery separator tends to direct fluid to adjacent battery plates even when an electrolyte level, within the battery, drops below the tops of the plates.

16 Claims, 4 Drawing Sheets

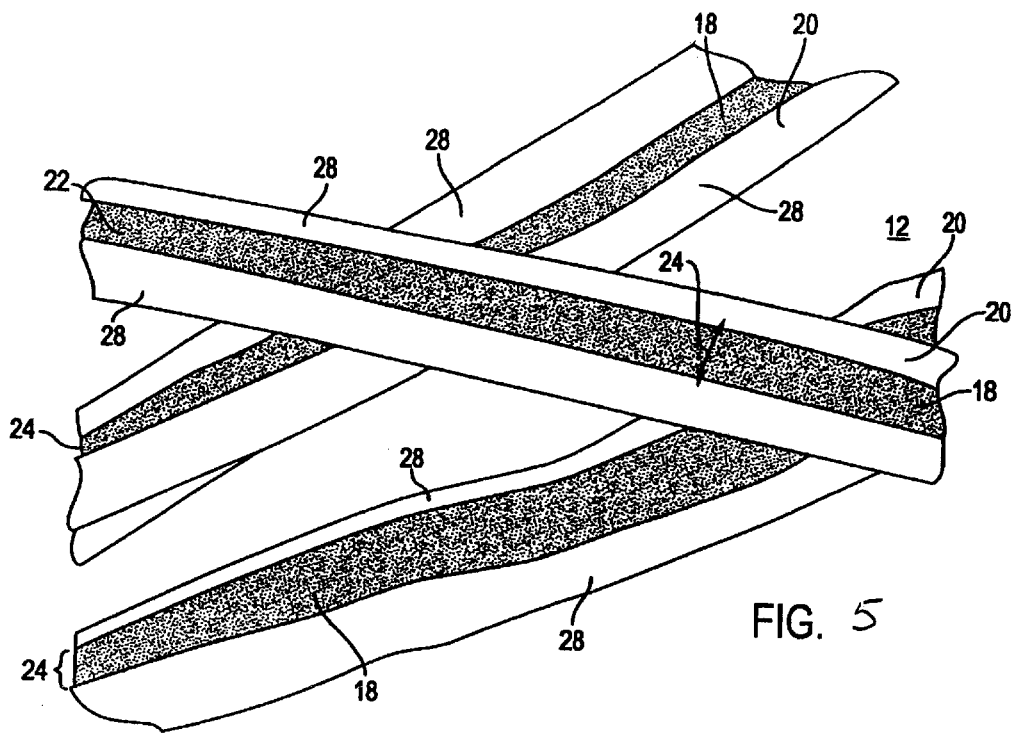
FIG. 5
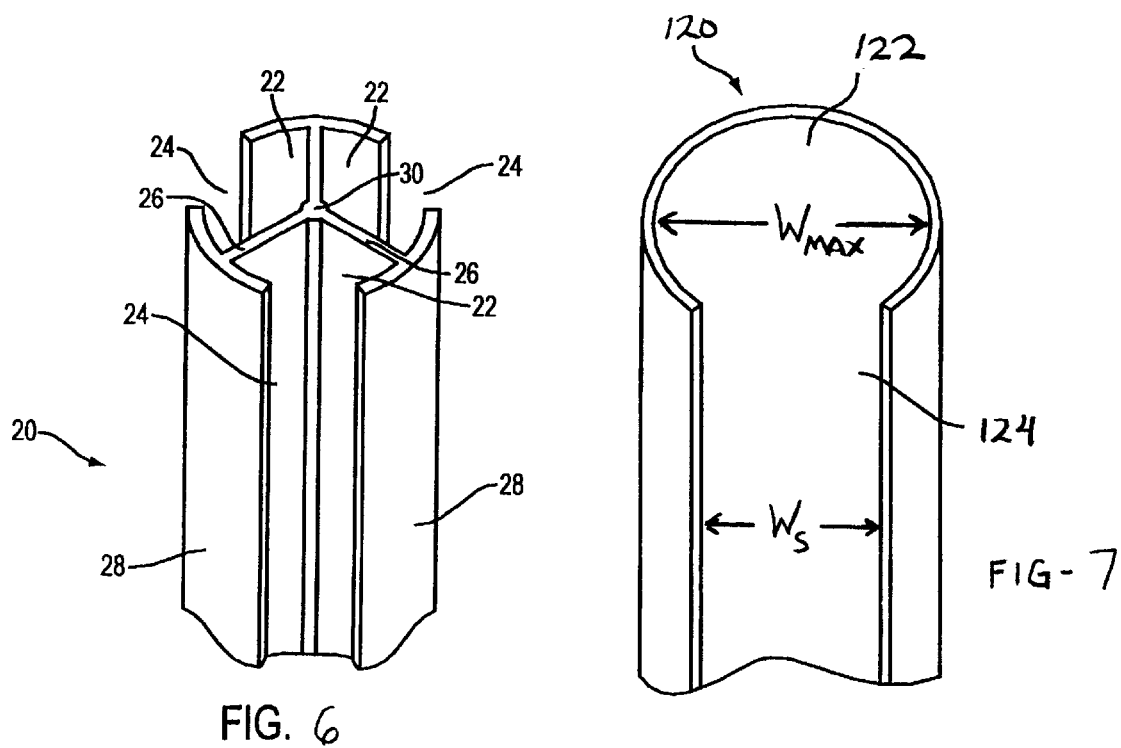
FIG. 6
FIG. 7

MICROCAPILLARY BATTERY SEPARATOR INCLUDING HOLLOW FIBERS, AND STORAGE BATTERY INCORPORATING SAME

BACKGROUND OF THE INVENTION

1. Field of the invention

The present invention relates to battery separators for placing between charged plates within a battery. More particularly, the present invention relates to such a battery separator which includes a non-woven fiber mat, in which one or more component fibers have a specific cross-sectional shape and exhibit a microcapillary action.

2. Description of the Relevant Art

Many types of electrical storage batteries are known and are widely used. Batteries, of the type which use internal charged metal plates, normally will also include porous non-conductive separators between the plates to insulate them from directly touching one another.

For example, a fairly standard prior art design for an electrical storage battery 110 is shown in FIG. 1. A prior art battery of this type is disclosed in U.S. Pat. No. 4,440,838. In this standardized design, which is widely used today, a hollow plastic casing 111 contains a plurality of positive plates 112, joined together by a conductive connector bar 114 which is attached to a positive terminal 116. The positive plates 112 alternate with a plurality of negative plates 118, and in similar fashion, the negative plates are joined together by a conductive connector bar 115 which is attached to a negative terminal 117. Each of the negative plates 118 is surrounded by a sleeve 120, made out of two sheets 122, 123, joined together at the outer edges thereof. The sheets are formed of separator material.

It is known to make such battery separators out of nonwoven polymeric fibers. Examples of such battery separators may be found in U.S. Pat. Nos. 3,811,957, 3,875,270, 3,947537, 4,705,809, 5,158,844, and 5,318,866.

U.S. Pat. No. 4,137,379, issued in 1979 to Schmidt et al. and entitled "Storage Battery with Separator of Dumbbell-Shaped Fibers" discloses a storage battery in which a compressed mat of non-woven fibers is used as a fabric separator to space apart battery plates. The fibers making up the separator of Schmidt et al. have a dumbbell-shaped cross-sectional profile.

The assignee of the present invention has developed a new type of hollow fiber, having a longitudinally extending internal cavity therein, which may exhibit a 'wicking' or microcapillary action when placed into a fluid. Examples of these fibers, and some possible applications thereof, are given in U.S. Patent Nos. 5,069,970, 5,713,971, 5,759,394, 5,891,221 and 5,951,744.

While the known battery separators are useful for their intended purposes, a need still exists in the art for an improved battery separator which can promote fluid flow therethrough. It would also be advantageous if a battery separator were to be made of fibers having hollow channels formed therein to promote fluid flow therethrough.

SUMMARY OF THE INVENTION

The present invention has been developed to overcome the foregoing limitations and disadvantages of known battery separators, and to generally fulfill a need in the art for a battery separator adapted to promote the flow of fluids therethrough.

The present invention provides a battery separator for placement between conductive plates of a battery, including a non-woven fiber mat made up of a at least one, and preferably a plurality of nonwoven fibers. Each of the fibers includes an outer surface, a hollow internal cavity, and an extended slot. The hollow internal cavity communicates with the outer surface by way of the extended slot. The hollow internal cavity has a maximum width at an interior portion thereof, and the width of the slot is less than the maximum width of the internal cavity.

In a preferred embodiment, each of the nonwoven fibers includes a central stem and a plurality of substantially T-shaped lobes extending radially outwardly from the stem.

Optionally, the fiber mat may include a substantially continuous extended length hollow fiber, which is wrapped back on itself multiple times.

Capillary forces within the hollow fibers are greater than those on the fiber surface, such that a liquid electrolyte readily moves through the interior of the fiber via a 'wicking' action. As a result, the battery separator tends to direct fluid to adjacent battery plates, even when the battery electrolyte level drops below the tops of the plates.

Thermoplastics are a preferred material for the fibers. Preferably, the material making up the fibers is selected from the group consisting of polyolefins, fluoropolymers, polyimides, polysulfones, polyesters, polyamides, and mixtures thereof. It is an object of the present invention to provide an improved battery separator which is usable in conjunction with a liquid electrolyte.

Another object of the present invention is to provide an improved battery separator which tends to direct liquid electrolyte to adjacent battery plates, even when an electrolyte level within the battery casing drops below the top of the plates.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 5 is a further enlarged view of several elongated wicking fibers of the fiber mat of FIG. 4, showing a reagent material disposed within the longitudinally extending fiber cavities;

FIG. 6 is an end perspective view, partially cut away, of a first preferred wicking fiber suitable for practicing the present invention;

FIG. 7 is an end perspective view, partially cut away, of an alternative wicking fiber which is also usable in the practice of the invention.

DETAILED DESCRIPTION OF THE PREFERRED EMBODIMENTS

Figure 3:
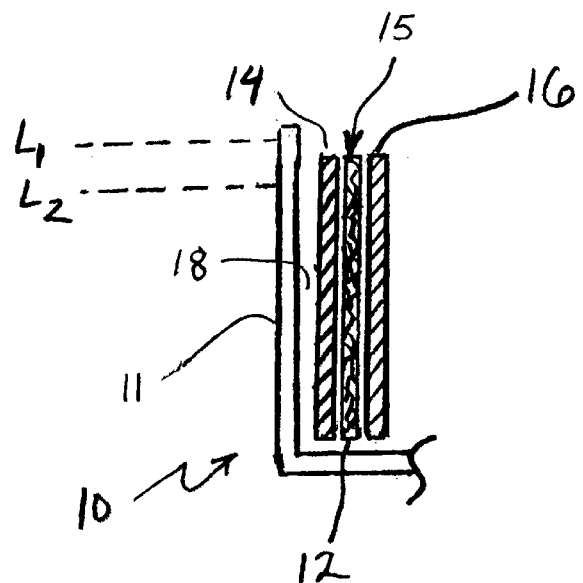
FIG. 3 is a partially cut away cross-sectional view of a battery, showing a battery separator therein interposed between of a pair of adjacent battery plates.
Figure 4:
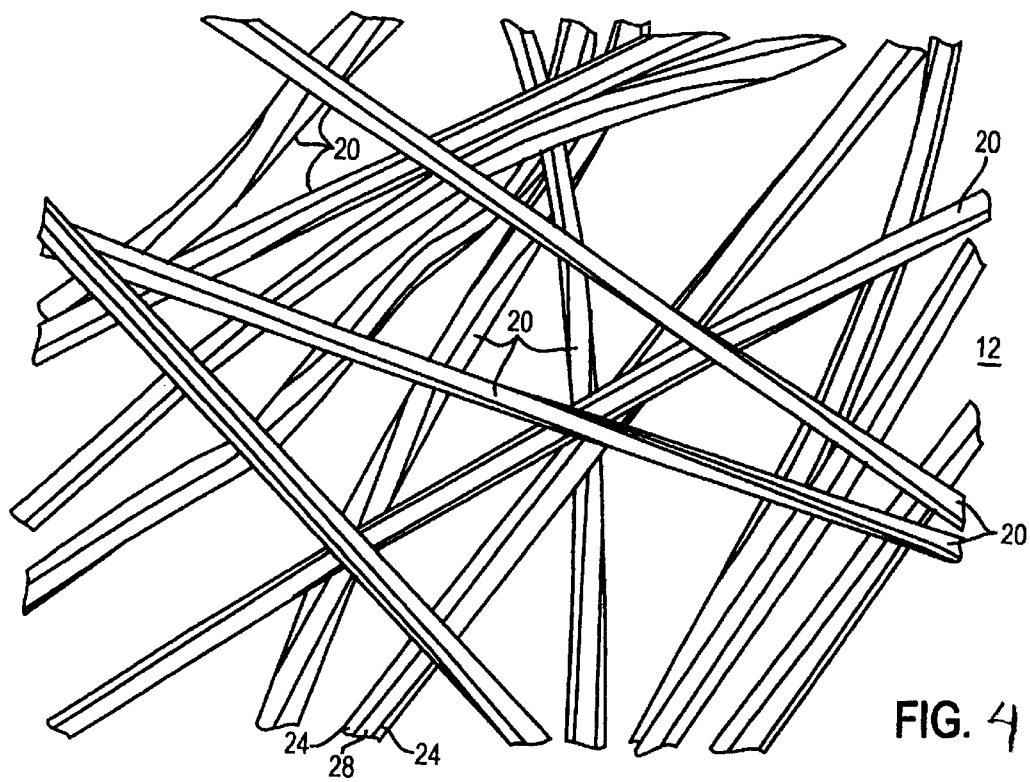
FIG. 4 is an enlarged perspective view of a portion of a fiber mat which makes up a major part of the battery separator in accordance with a first embodiment of the present invention.

Referring to FIG. 3, a cut away section of a battery 10 is shown according to the first preferred embodiment of this invention. The battery 10 contains a plurality of conductive metallic plates such as those shown at 14 and 16, with a battery separator panel 15 interposed between adjacent plates. The plates 14, 16 and the battery separator panel 15 are immersed in a liquid electrolyte 18. The electrolyte 18 may be sulfuric acid, an alkali hydroxide, or other liquid electrolyte solution. The battery separator panel 15 includes a generally flattened non-woven fiber mat 12, which is placed between the battery plates 14, 16 within a battery casing 11. The fiber mat 12 includes a multiplicity of individual fibers 20 (FIGS. 4–5). The mat 12 is normally rectangular, but may be made in any desired shape to fit the profile of the battery casing I 1.

The Wicking Fibers

Figure 1:
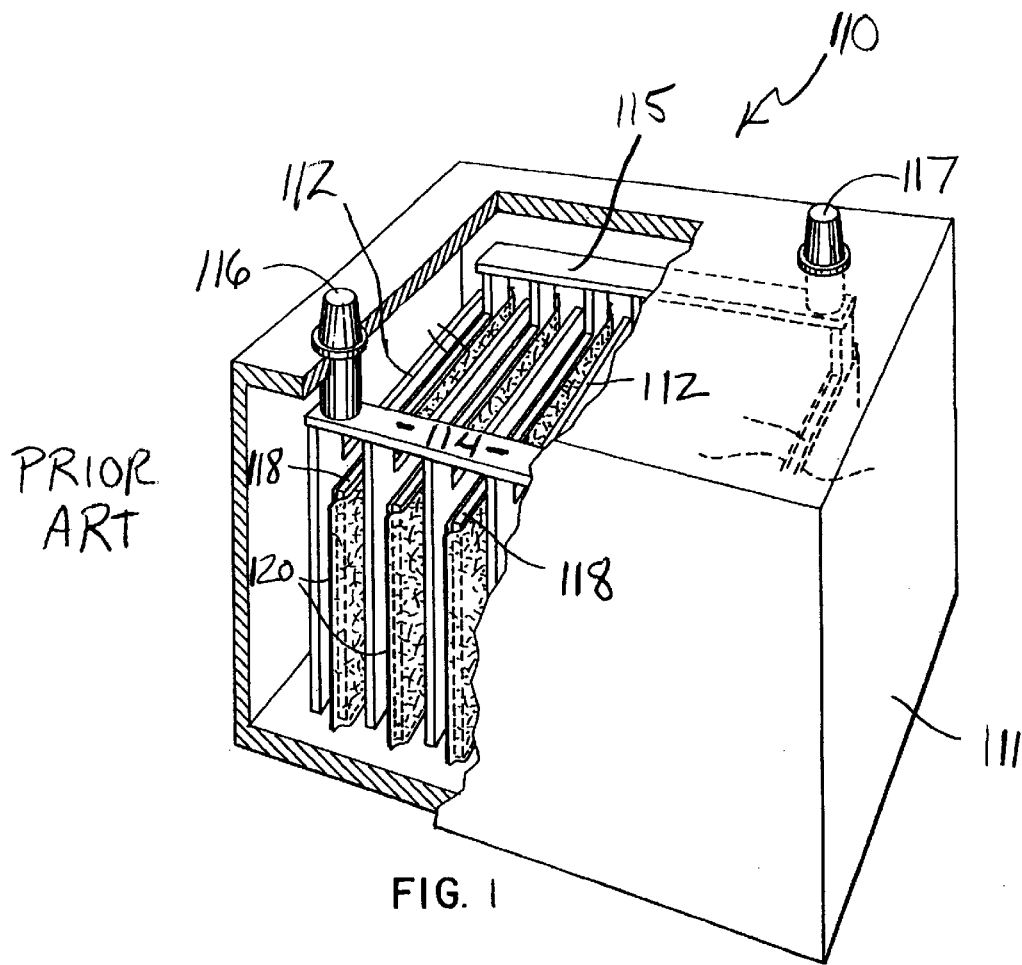
FIG. 1 is a partially cut away perspective view of a prior art battery, showing battery separators therein interposed between adjacent battery plates.
Figure 2:
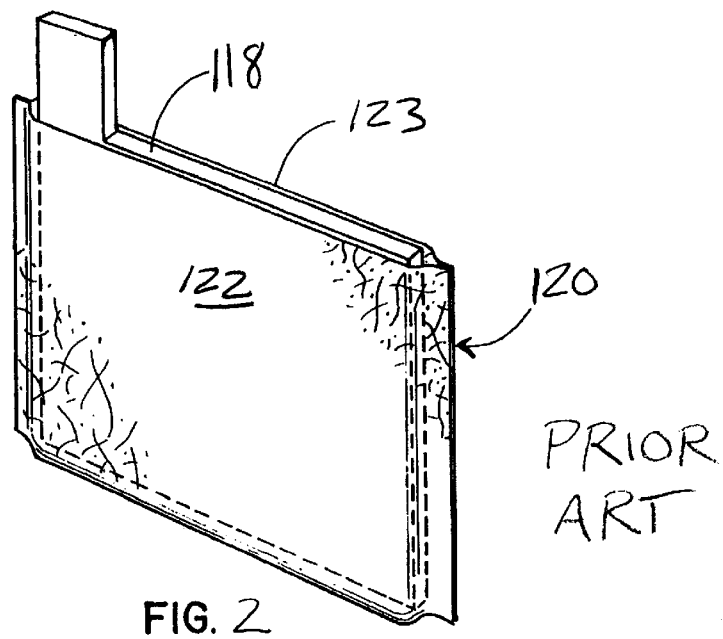
FIG. 2 is a perspective view of a battery plate with a separator sleeve thereon.

The fiber mat 12 may include a multiplicity of randomly oriented intertwined wicking fibers 20, as shown in FIGS. 2 through 4.

Alternatively, the mat 12 may be formed from one substantially continuous extended-length fiber, or a small number of extended-length fibers, in which a fiber is wrapped back on itself multiple times. As will be further detailed herein, the fibers 20 have the capacity to direct a flow of electrolyte 18 therethrough via passive capillary action.

A wicking fiber that is particularly suitable for practicing this invention is disclosed in U.S. Pat. No. 5,057,368, the disclosure of which is incorporated by reference. This patent discloses a fiber formed from thermoplastic polymers, wherein the fiber has a cross-section with a central core or stem 30, and a plurality of substantially T-shaped lobes 26 (FIG. 6). The legs of the lobes 26 intersect at the core 25 so that the angle between the legs of adjacent lobes is from about 80 degrees to 130 degrees. The thermoplastic polymer is typically a polyolefin, a fluoropolymer, a polyimide, a polysulfone, a polyester, a polyamide, or a combination thereof.

FIGS. 4–6 show the fiber sections 20 making up the mat 12, in an increasing level of detail and magnification in each succeeding figure. FIG. 4 shows a detail view of a number of intertwined sections of fiber 20 making up the mat 12. FIG. 5 shows a further magnified detail view of three of the fiber sections 20, and also shows a liquid electrolyte 18 which may be disposed therein. FIG. 6 is a close-up detail perspective view of an end of one preferred fiber 20, with the liquid electrolyte deleted from the drawing for purposes of illustration.

The wicking fiber as illustrated in FIG. 6 is formed as an extruded strand having three hollow longitudinally extending interior cavities 22, each of which communicates with the outer strand surface 28 by way of longitudinally extending slots 24 defined between adjacent lobes 26. The fibers 20 may be made of one or more type of wicking material strands such as polyolefins, fluoropolymers, polyimides, polysulfones, polyesters, polyamides, and mixtures thereof; or other suitable polymeric material which may be formed into the desired configuration, and which is stable with respect to the electrolyte fluid being filtered therethrough.

The three cross-sectionally T-shaped segments may have their outer surface 28 curved, as shown, or straight. While the wicking fiber 20 is depicted as tri-lobed in FIG. 6, it will be understood that any other number of lobes are suitable, particularly two, four or five lobes.

FIG. 7 shows an alternative configuration for a fiber 120, which is usable in the practice of the present invention. The fiber shown in FIG. 7 has a C-shaped cross-section, with only a single longitudinally extending internal cavity 122, and a single longitudinally extending slot 124. Other cross-sectional shapes may also be suitable. The specific shape of the wicking fibers is not critical, so long as the fibers selected can allow fluid flow through the internal cavities thereof Most preferably, the maximum width of the internal fiber cavities is greater than the slot width.

The wicking fibers 20, 120 are relatively small, having a diameter in a range between 30 and 250 microns. The width $W_s$ (FIG. 7) of the longitudinally extending slots 24, 124 is normally less than one half of the diameter of the fibers 20 or 120. As a result, the interior cavity 22, 122 has a maximum width $W_{MAX}$ which is larger than the width $W_s$ of the slot.

Capillary Effect

The capillary forces within the individual cavities 22 are much greater than those external to the fiber 20, such that a liquid electrolyte is readily wicked up within the interior of the fiber 20. The fibers 20 strongly retain the liquid, so that the electrolyte is effectively pumped through the fibers.

Without wishing to be bound by any theory, it is believed that the capillary forces provided by the structure of the fibers 20 provides the advantage of passively pushing a liquid electrolyte upwardly along the mat 12, without requiring external energy input. This means that even when the electrolyte level within the battery 10 drops below the top of the plates 14, 16, the capillary action of the mat fibers 20 will tend to direct liquid electrolyte on to the exposed portions of the plates 14, 16. This will have a tendency to prolong the useful life of the battery as compared with a battery separator which does not exhibit such a capillary action.

In FIG. 3, a normal level of battery electrolyte is suggested by the upper line $L_1$, while a depleted level of electrolyte is indicated at the lower line $L_2$. As noted above, even when the electrolyte drops to a depleted level $L_2$ which is below the tops of the plates 14, 16, the capillary action of the fibers 20 within the separator 15, according to the invention, will tend to move the electrolyte upwardly in the battery 10, effectively keeping the upper sections of the plates 14, 16 coated with electrolyte.

The fiber 20, the width of the slots 24, and the dimensions of the interior cavities 22 are selected to promote and maximize capillary effect of the battery separator 15. If desired, the fibers 20, 120 may be treated with an appropriate surfactant or otherwise chemically treated to promote capillary effect.

Another aspect of the present invention is that additives or other beneficial reagents may be used in the interior cavities 22 of the fibers 20 to enhance the function of the separator 15, either in its ability to hold electrolyte therein, to enhance its ability to maintain dimensional stability through deep cycle charging or recharging, or to mitigate the effects of contaminants. Such reagents may be time-release material, or may be permanently entrapped in the cavities 22.

Figure 8:
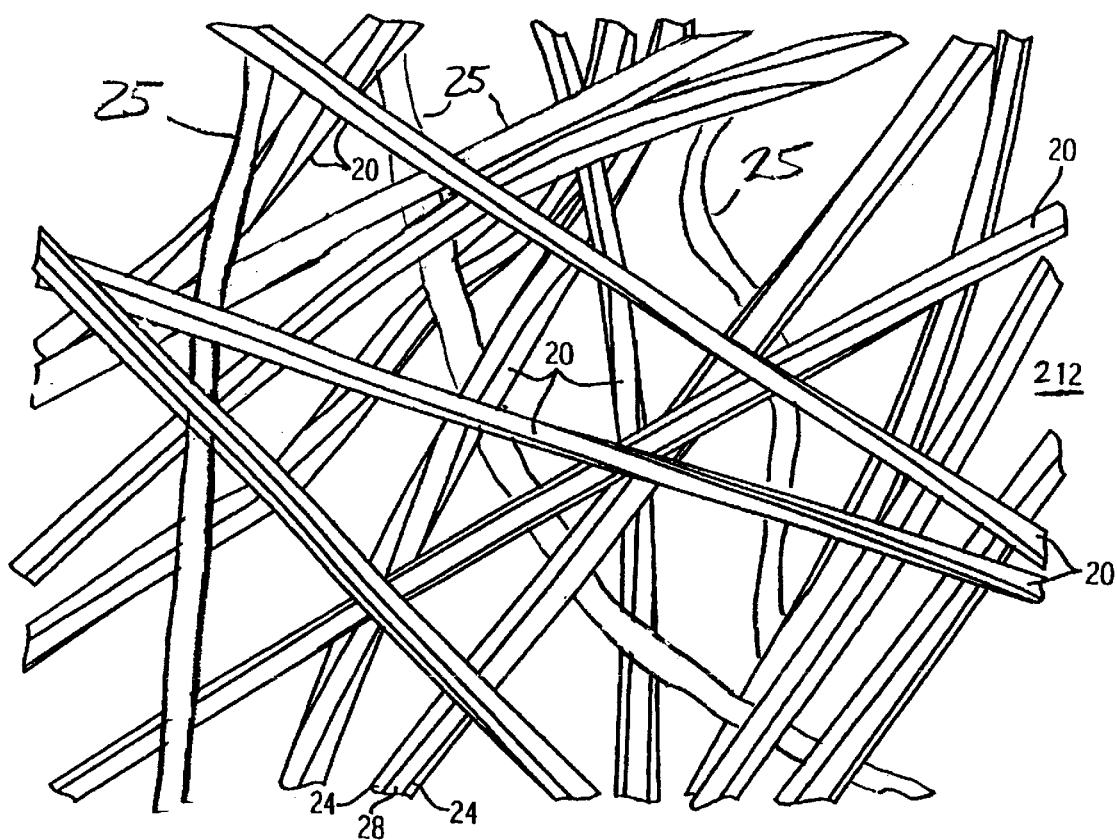
FIG. 8 is an enlarged perspective view of a portion of a fiber mat which makes up a major part of the battery separator in accordance with a second embodiment of the present invention.

As shown in FIG. 8, in an alternative embodiment of the invention, the fiber mat 212 of the battery separator panel 15 may include a combination of both hollow fibers 20 and solid fibers 25, if desired, for greater strength and compression resistance. The mat 212 may include hollow 'wicking' fibers as shown in FIGS. 5–7 in combination with glass fibers, polymeric fibers, and/or inorganic particles, held together with a glue or binder. Alternatively, the fibers making up the mat 212 may be heat-fused together.

Although the present invention has been described herein with respect to a preferred embodiment thereof, the foregoing description is intended to be illustrative, and not restrictive. Those skilled in the art will realize that many modifications of,the preferred embodiment could be made which would be operable. All such modifications, which are within the scope of the claims, are intended to be within the scope and spirit of the present invention.

We claim:

1. A battery separator for placement between conductive plates of a battery, comprising:

a non-conductive non-woven fiber mat comprising at least one hollow fiber having an outer surface, a hollow internal cavity, and an extended slot formed therein, wherein the hollow internal cavity is in fluid communication with the outer surface.

2. The separator of claim 1, wherein said hollow fiber comprises a central stem and a plurality of T-shaped lobes extending radially outwardly from the stem.

3. The separator of claim 2, wherein said hollow fiber includes three lobes.

4. The separator of claim 1, further comprising a reagent material disposed in the internal cavity of said hollow fiber.

5. The separator of claim 1, wherein the hollow internal cavity of said hollow fiber has a maximum width at an interior portion of the fiber, and wherein the slot has a width less than said maximum width.

6. The separator of claim 1, wherein the hollow fiber is formed from a material selected from the group consisting of polyolefins, fluoropolymers, polyimides, polysulfones, polyesters, polyamides, and mixtures thereof.

7. The separator of claim 1, wherein the mat further comprises a plurality of solid fibers.

8. The separator of claim 1, wherein the mat comprises a continuous fiber which is wrapped back on itself multiple times.

9. A battery separator for placement between conductive plates of a battery, said battery separator comprising:

a plurality of solid fibers;

at least one non-conductive elongated hollow fiber having an outer surface, a hollow internal cavity, and an extended slot formed therein, wherein the hollow internal cavity is in fluid communication with the outer surface;

said hollow fiber further comprising a central stem and a plurality of T-shaped lobes extending radially outwardly from the stem.

10. A separator as recited in claim 8, wherein said hollow fiber includes three lobes.

11. The separator of claim 8, wherein the hollow internal cavity of said hollow fiber has a maximum width at an interior portion of the fiber, and wherein the slot has a width less than said maximum width.

12. The separator of claim 8, wherein the hollow fiber is formed from a material selected from the group consisting of polyolefins, fluoropolymers, polyimides, polysulfones, polyesters, polyamides, and mixtures thereof.

13. An electric storage battery comprising:

a battery casing;

a plurality of alternating negative and positive plates disposed within said casing;

a plurality of separators comprising at least one panel, wherein a separator panel is disposed between adjacent positive and negative plates;

wherein each said separator panel comprises at least one elongated non-conductive hollow fiber, said hollow fiber having an outer surface, a hollow internal cavity, and an extended slot formed therein, wherein the hollow internal. cavity is in fluid communication with the outer surface; and an electrolytic solution disposed within said casing.

14. An electric storage battery as recited in claim 13, wherein said hollow fiber of said battery separator comprises a central stem and a plurality of T-shaped lobes extending radially outwardly from the stem.

15. An electric storage battery as recited in claim 14, wherein each of said hollow fibers includes three lobes.

16. An electric storage battery as recited in claim 14, wherein the mat comprises a continuous fiber which is wrapped back on itself multiple times.

* * * * *